J. M. GANTVOORT.
BAKING OVEN.
APPLICATION FILED OCT. 17, 1910.

1,010,421.  Patented Dec. 5, 1911.

UNITED STATES PATENT OFFICE.

JOHANNUS MARTINUS GANTVOORT, OF FISHKILL-ON-THE-HUDSON, NEW YORK.

BAKING-OVEN.

1,010,421.　　　Specification of Letters Patent.　　Patented Dec. 5, 1911.

Application filed October 17, 1910. Serial No. 587,516.

*To all whom it may concern:*

Be it known that I, JOHANNUS MARTINUS GANTVOORT, a subject of the Queen of The Netherlands, and residing at Fishkill-on-the-Hudson, in the county of Dutchess and State of New York, have invented a certain new and useful Improvement in Baking-Ovens, of which the following is a specification.

My invention relates to baking ovens and particularly to the common bread baker's oven now in general use in large cities and has for its object an improvement thereof to maintain the same at a more uniform heat throughout after the flow of the heating gases has been stopped.

Figure 1:
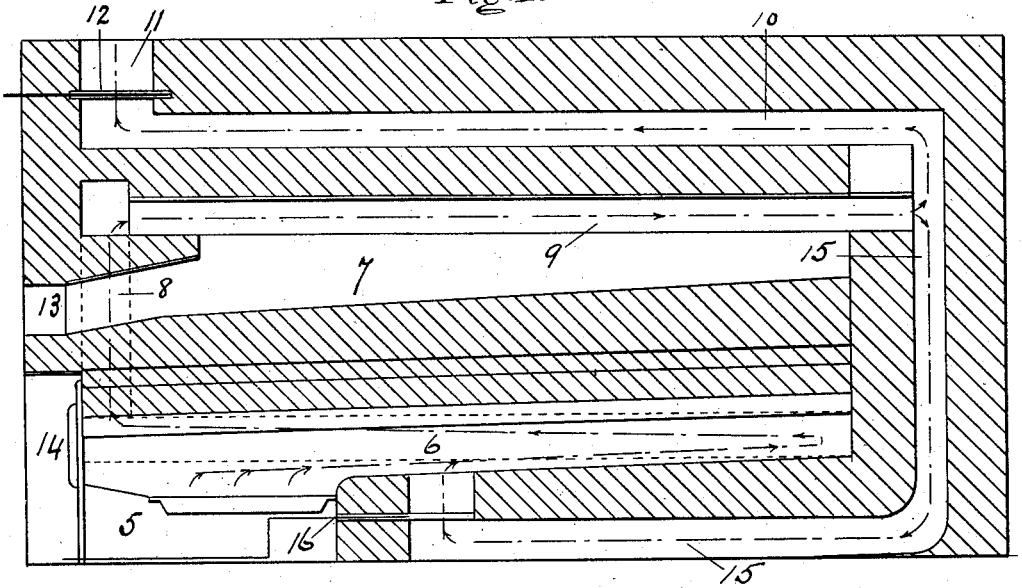
Figure 2:
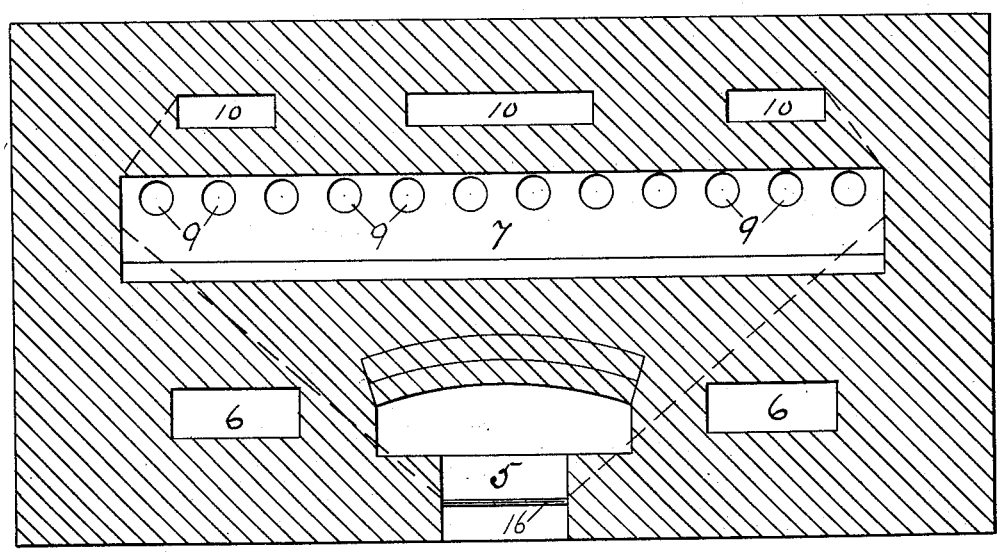

In the accompanying drawing, Figure 1 is a vertical longitudinal section of an oven in which my invention is embodied; Fig. 2 is a transverse section thereof.

In its main features the oven illustrated is of the common type in general use, having a fire box 5, the products of combustion from which rise through the almost horizontal flue 6 beneath the floor of the baking chamber 7, pass up through the vertical side risers 8 to the exposed pipe flues 9 extending across the upper portion of the baking chamber and finally travel through the practically horizontal flues 10 in the top of the oven above the baking chamber to the chimney 11. The slide damper 12 controls the chimney passage. The usual door 13 opens into the baking chamber for charging and discharging the same; while the usual furnace door 14 controls the entrance to the fire box. In ovens of this character it is the common practice, after a batch of bread has been sufficiently baked, to economize fuel by closing the slide damper 12. This of course checks the fire and renders stagnant the combustion gases that fill the various flues of the oven. Radiation of the heat sets in at once and if the door of the oven remains open, as it must for a while at least, while the baked bread is being withdrawn, the pipes 9 in the top of the oven cool quite materially. Moreover radiation of heat from the upper walls of the oven goes on quite rapidly, much more rapidly than in the lower part of the oven which are adjacent and still heated by the dormant fire in the fire box. The result of this is that when the next batch of bread is ready to be placed in the oven, half an hour, say, after the damper 12 has been closed, the pipes 9 are not at proper baking heat, while the bottom of the oven, still taking its heat from the fire box, has not dropped materially from its baking temperature. This difference is of course very much greater after the fire has been banked over night and the day's baking is first begun in the morning. In either case baking must be delayed until the pipes have been properly heated up by the renewed draft or the bottom of the oven must be temporarily cooled to such a temperature that the bread will not be bottom-baked before the pipes have properly heated the upper portion of the baking chamber. The latter is the common practice and is accomplished by swabbing down the bottom of the oven with water. This trouble I now propose to entirely overcome by providing the oven with a supplemental circulation passage adapted to be opened after the chimney draft has been closed by the damper 12, and establishing such a circulating communication between the upper flue passages of the oven and the lower passages that said upper passages are continuously heated from the dormant fire box and the temperature of the oven thus maintained uniform in spite of the closing of the chimney draft. This I accomplish in the form illustrated by the passageway 15, opening at the top into the junction between the pipes 9 and the top flues 10 on the one hand, and leading down and beneath the baking chamber to the flue 6 into which it opens through a port controlled by the slide damper 16. The operation of this circulating passage is clear. As soon as the damper 12 is closed, the damper 16 is opened. As the radiation of heat from the upper portion of the oven cools the gases in the flues 9 and 10, these gases descend through the passageway 15 and are drawn into the flue 6 by the more highly heated gases passing therethrough directly from the fire box. Obviously the heating gases coming from the grate will continue to rise through the flues 6 and there will be no tendency to flow down into the supplemental passageway 15, since the latter is led back to the flue 6 from a point below the opening of the latter to the grate. This circulation becomes more rapid as the oven tends to cool, since the discrepancy between the temperature of the gases near the surfaces distant from the fire box and that of the gases in the flues near the fire box becomes greater. But at no time does the discrepancy approach that which at present exists, since the circulation system established through said supplemental passage serves to keep the temperature of the oven as a whole much more uniform.

Obviously the arrangement of the circulating passage need not be precisely that illustrated, and I do not limit my invention to this precise form, but claim as my invention:—

1. In a baking oven heated by gases passing through flues around the baking chamber, a supplemental flue connecting the approximate end to the approximate beginning of said flue system in said oven, said supplemental flue being led during its course to a point below the beginning of the flue system, substantially as described.

2. A baking oven having a baking chamber, a heat generator arranged beneath said chamber, heating flues leading upward from said generator through the oven to heat the baking chamber, in combination with a supplemental return passage connecting portion of said flue system beyond the baking chamber with a portion of said system in advance of said chamber and means for controlling the flow of gases therethrough, said return passage being led to a level below that of the flue leading upward from the heat generator, substantially as described.

3. In a baking oven, the combination of a baking compartment, a fire place located under the same, a flue leading from the fire place successively under and then over the baking compartment and to the chimney, together with a supplemental flue connecting the flues above the baking compartment with the flues under the baking compartment and being led during its course to a point below the fire place, substantially as described.

4. In a baking oven, the combination of a baking compartment, a fire place located under the same, a flue leading from the fire place successively under and then over the baking compartment and to the chimney, together with a supplemental flue connecting the flues above the baking compartment with the flues under the baking compartment and being led during its course to a point below the fire place together with dampers controlling the said heating flue and supplemental return flue, substantially as described.

In testimony whereof I have signed my name to this specification, in the presence of two subscribing witnesses.

JOHANNUS MARTINUS GANTVOORT.

Witnesses:
GEORGE WILLIAMSON,
DAVID J. HANNA.

Copies of this patent may be obtained for five cents each, by addressing the "Commissioner of Patents, Washington, D. C."